Figure 32:
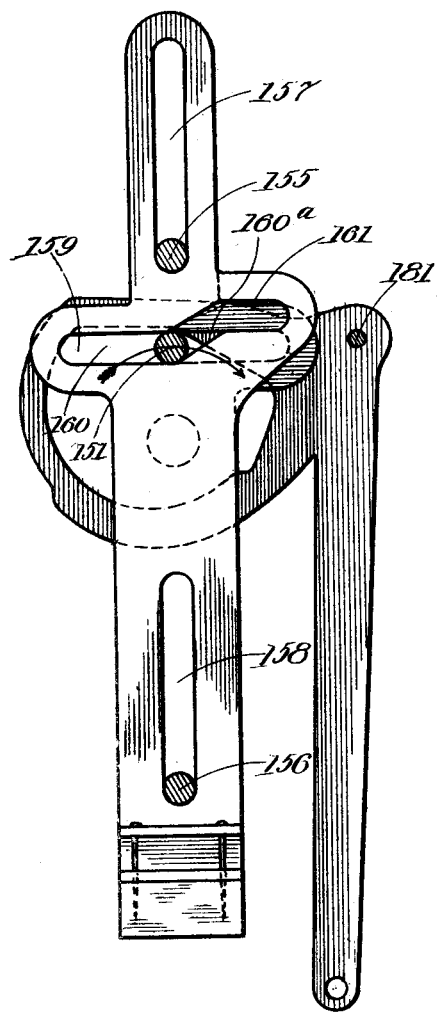

G. L. REICHHELM.
STAMP VENDING MACHINE.
APPLICATION FILED SEPT. 20, 1909.
1,071,178.
Patented Aug. 26, 1913.
10 SHEETS—SHEET 1.
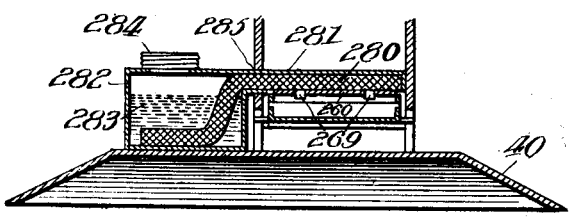
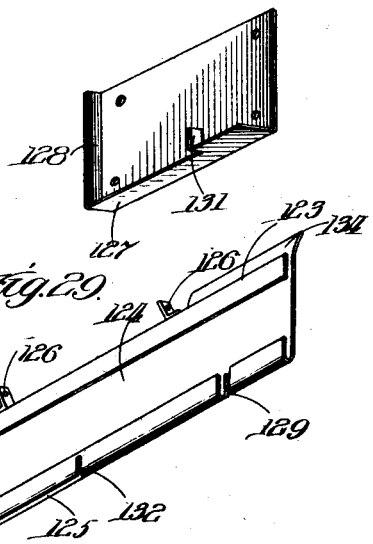
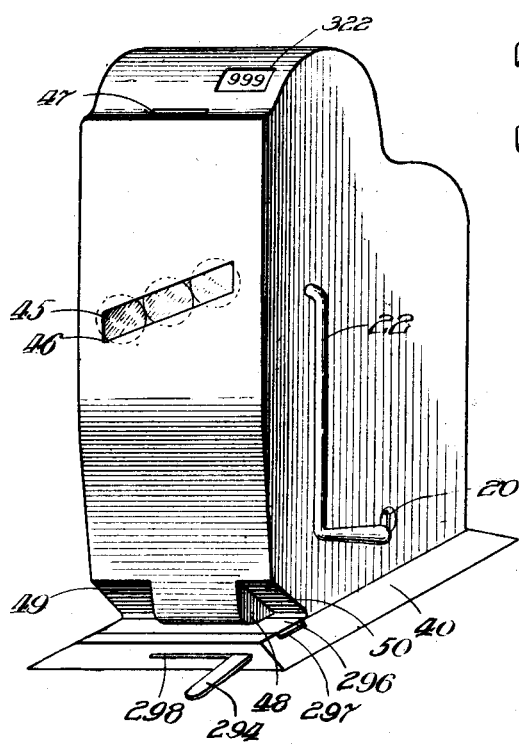
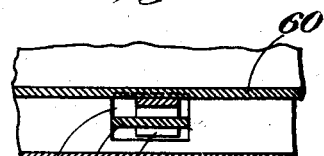
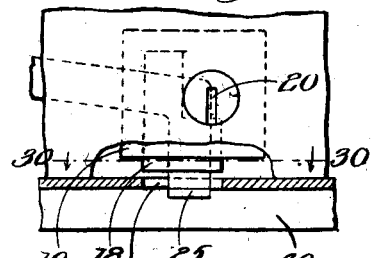
Inventor:
George L. Reichhelm

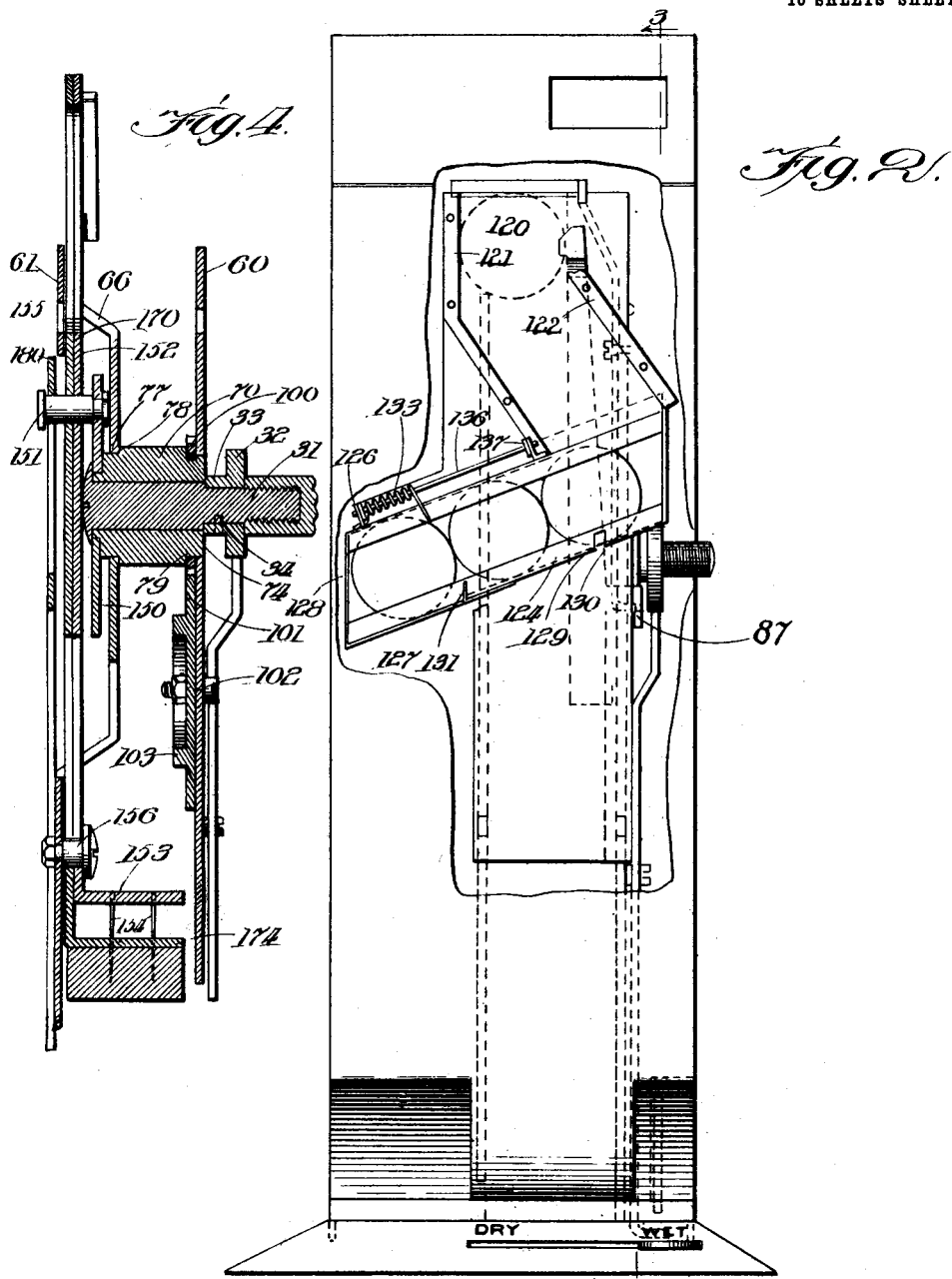

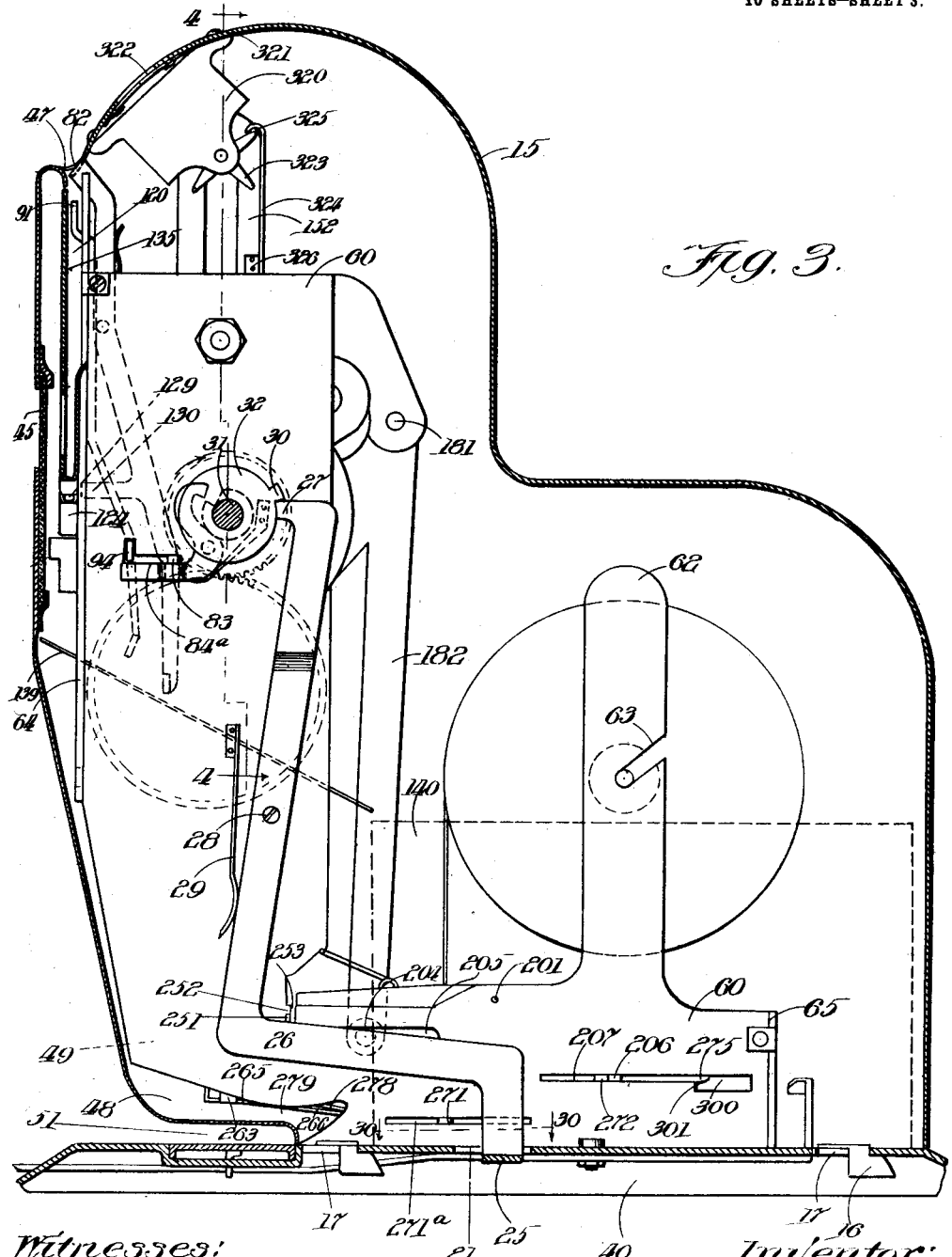

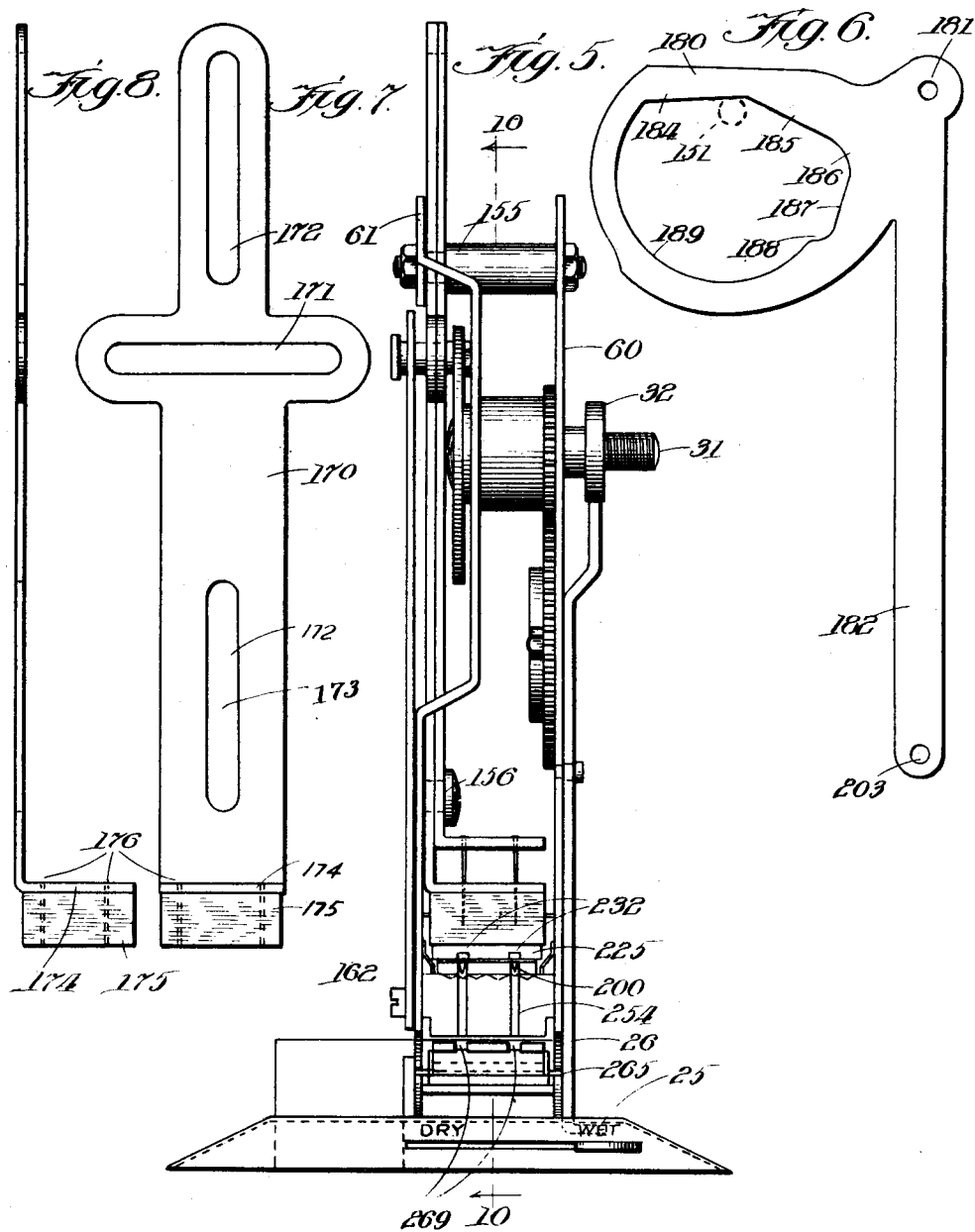

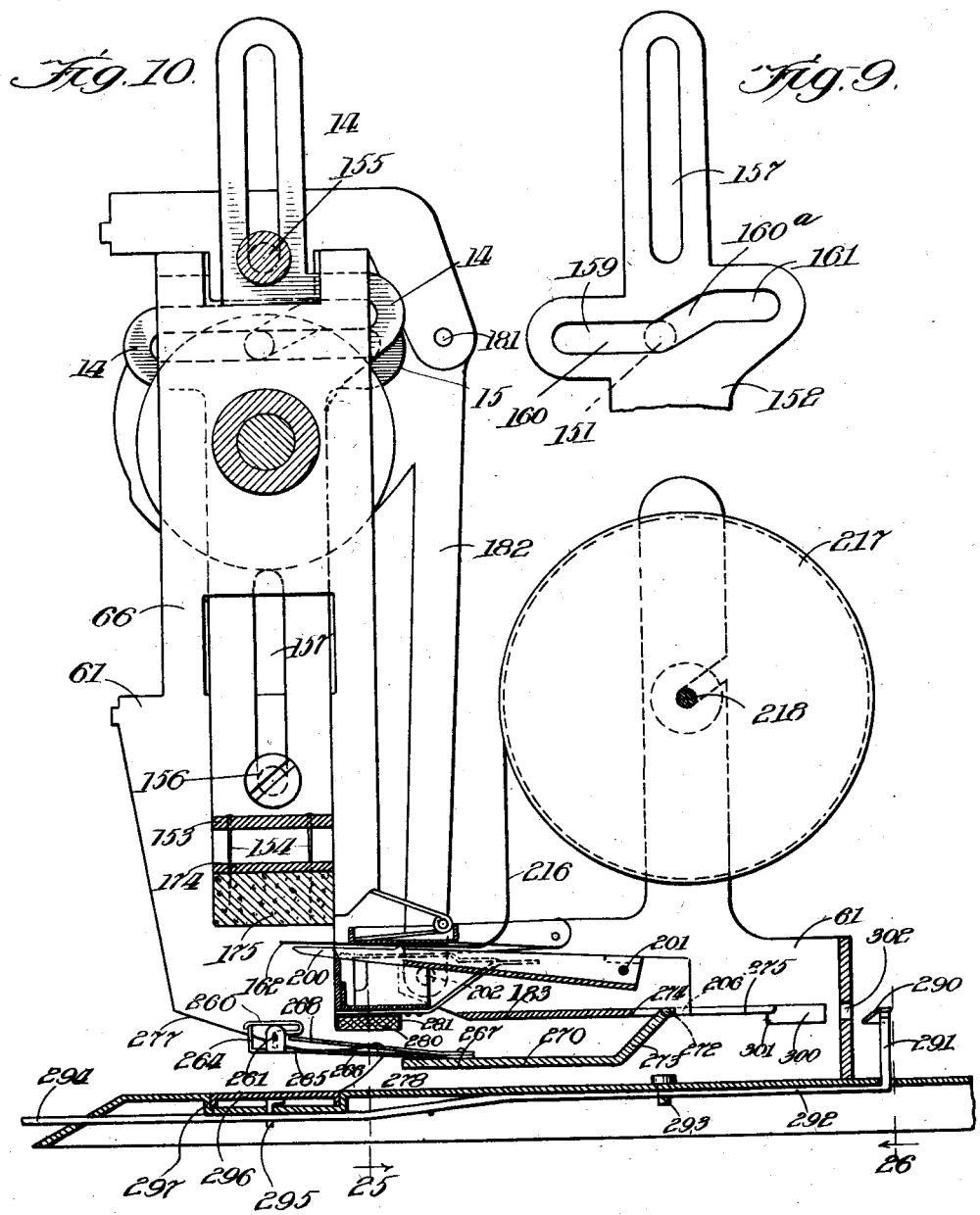

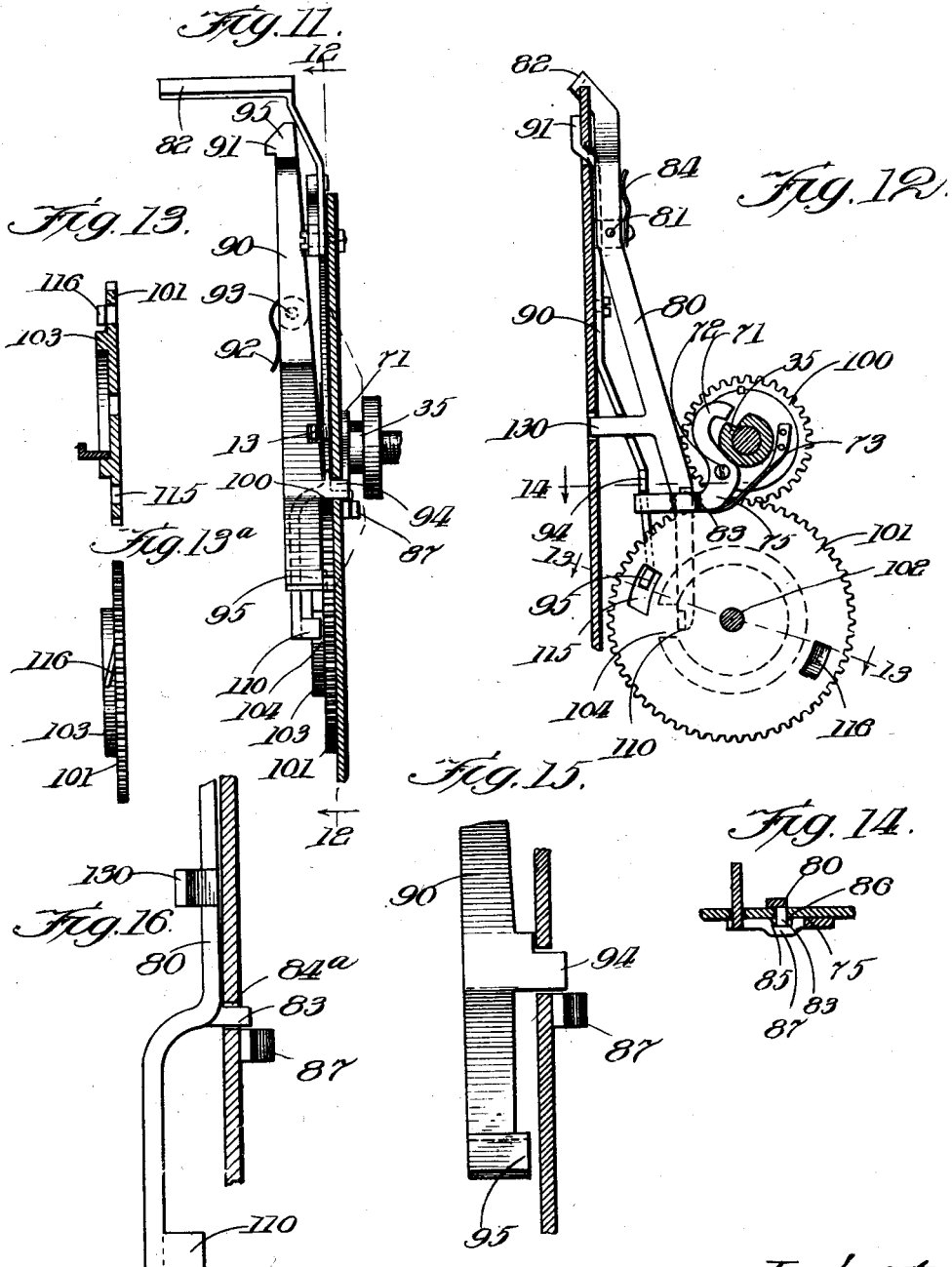

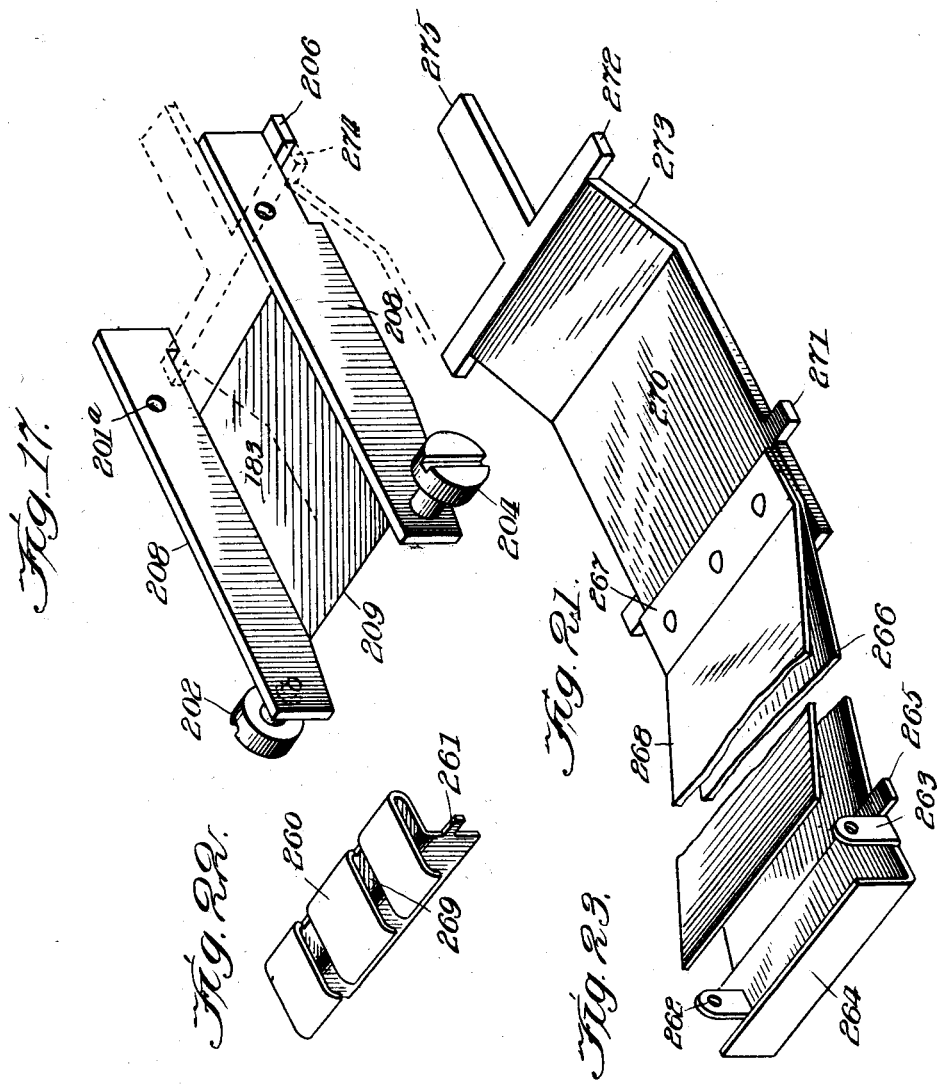

G. L. REICHHELM.
STAMP VENDING MACHINE.
APPLICATION FILED SEPT. 20, 1909.
1,071,178. Patented Aug. 26, 1913.
10 SHEETS—SHEET 8.
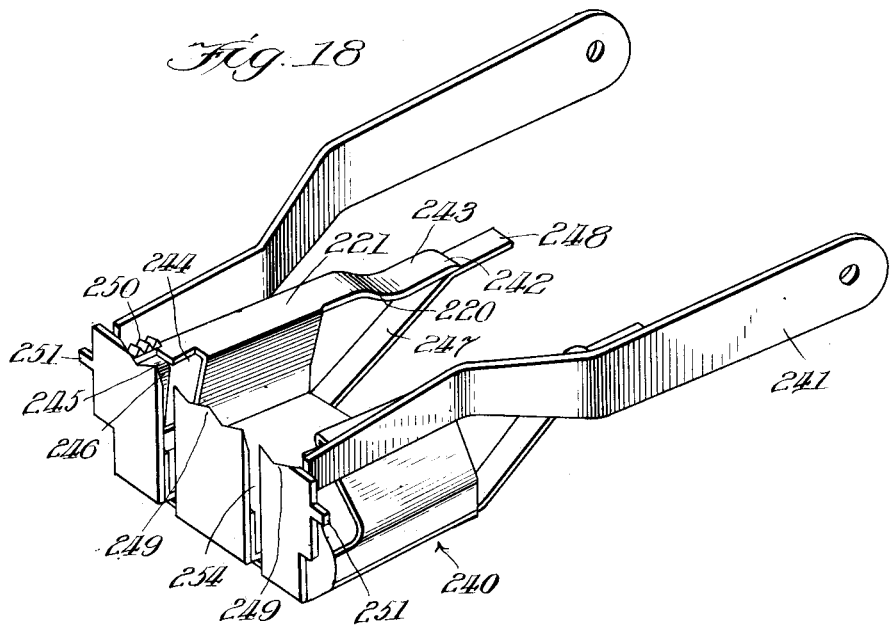
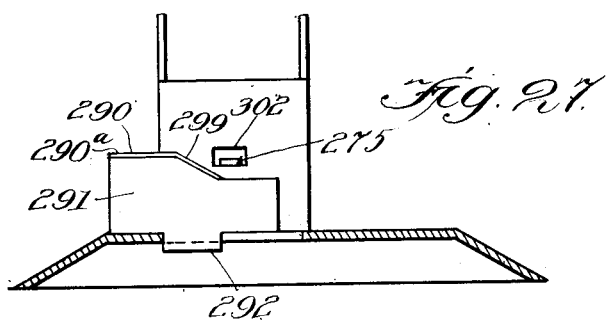
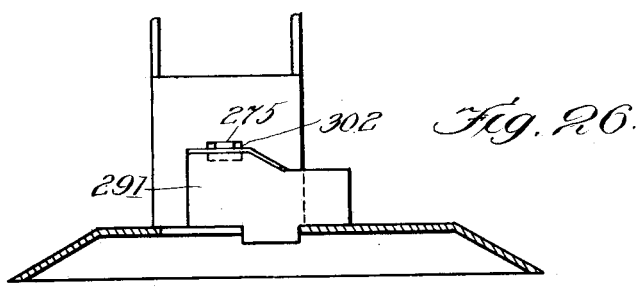
Witnesses:
Inventor
George L. Reichhelm
by Sheridan, Wilkinson & Scott
Attys

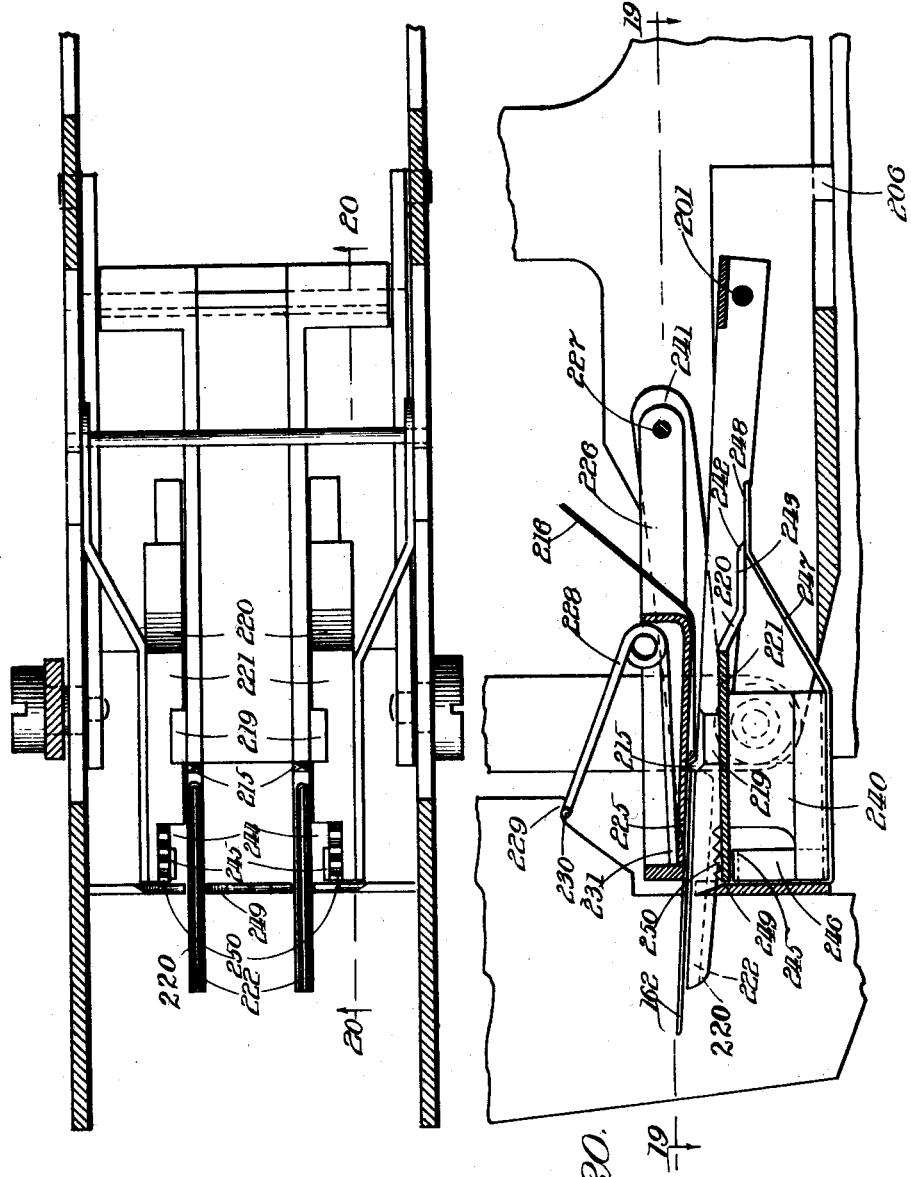

G. L. REICHHELM.
STAMP VENDING MACHINE.
APPLICATION FILED SEPT. 20, 1909.

1,071,178.

Patented Aug. 26, 1913.
10 SHEETS—SHEET 10.

Witnesses:
C. C. Burnap
Henry A. Parks

Inventor
George L. Reichhelm
by Sheridan, Wilkinson & Scott
attys

UNITED STATES PATENT OFFICE.

GEORGE L. REICHHELM, OF DENVER, COLORADO, ASSIGNOR, BY DIRECT AND MESNE ASSIGNMENTS, OF ONE-HALF TO FREDERICK A. CURTISS, OF DENVER, COLORADO, AND ONE-HALF TO P. R. MANUFACTURING COMPANY, OF DETROIT, MICHIGAN, A CORPORATION OF MICHIGAN.

STAMP-VENDING MACHINE.

1,071,178.     Specification of Letters Patent.     Patented Aug. 26, 1913.

Application filed September 20, 1909. Serial No. 518,535.

*To all whom it may concern:*

Be it known that I, GEORGE L. REICHHELM, a citizen of the United States, residing at Denver, in the county of Denver and State of Colorado, have invented certain new and useful Improvements in Stamp-Vending Machines, of which the following is a specification.

It has heretofore been proposed to vend stamps by means of machines, and thereby obviate the expense of an attendant to sell the stamps, but it has been found difficult to accurately sever the delivered stamp from the supply strip of stamps owing to the character of feeding mechanism heretofore employed. Such heretofore proposed machines have also been so complicated and delicate as to be incapable of withstanding the hard usage to which they must necessarily be subjected.

The primary object of my invention is to provide a machine for detaching from a strip of stamps, tickets, or similar flexible articles, one or more of such articles, and delivering the same to a purchaser, which will accurately detach the articles without mutilation regardless of the condition of the supply of the articles in the machine.

A further object of my invention is to provide an efficient machine for delivering postage stamps, gummed labels and the like, and affixing them to letters, packages etc.

A further object of my invention is to provide means whereby the operation of the machine may be controlled by the insertion of a coin therein and to so construct such means that there will be the least possible opportunity to fraudulently operate the machine.

Another object of my invention is to provide means for preventing the operation of the affixing devices and causing the stamps or other articles to be delivered in a dry condition.

Another object is to provide a mechanism by which a single coin will cause the delivery of a plurality of stamps, either dry or affixed.

Another object is to provide an automatic means for indicating the supply of stamps in the machine.

A still further object of my invention is to provide a machine for delivering stamps and similar flexible articles, which will be comparatively simple in construction, durable in use, and efficient in operation.

Other objects will be made apparent in the following specification and claims taken in connection with the accompanying drawings, in which—

Figure 24:
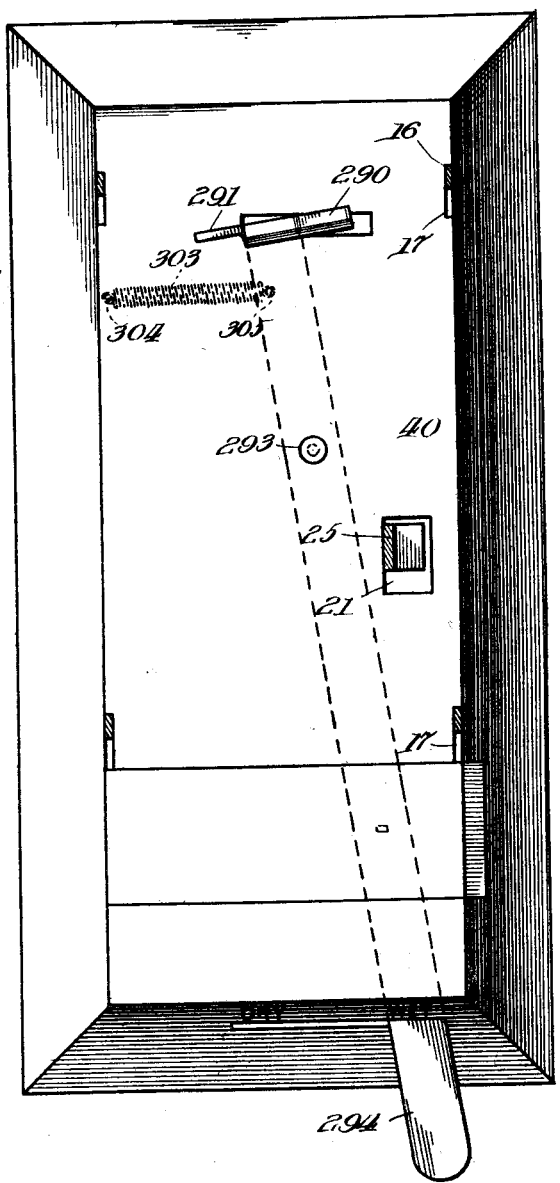

Figure 1 is a perspective view of my machine as equipped with a hand crank. Fig. 2 is a front elevation with portions of the casing broken away. Fig. 3 is a vertical section approximately on the line 3—3 of Fig. 2. Fig. 4 is a vertical section of the upper portion of the machine on the line 4—4 of Fig. 3 with the case removed. Fig. 5 is a front elevation with the case removed. Fig. 6 is a detail showing the cam which actuates the stamp feeding slide. Fig. 7 is a detail of the stamp pressing slide. Fig. 8 is a side view of same. Fig. 9 is a detail of the upper portion of the needle carrying slide. Fig. 10 is a vertical section on the line 10—10 of Fig. 5. Fig. 11 is a detail showing the coin operated levers. Fig. 12 is another view of same showing their connections with the clutch on the shaft. Fig. 13 is a horizontal section of a detail on the line 13—13 of Fig. 12. Fig. 13ª is an elevation of the same. Fig. 14 is a sectional plan view of a detail on line 14 of Fig. 12 showing the clutch arm. Fig. 15 is an enlarged view of the lower end of one of the coin actuated levers. Fig. 16 is an enlarged view of the lower portion of the other coin actuated lever. Fig. 17 is a perspective view of the stamp feeding slide. Fig. 18 is a perspective view of the basket. Fig. 19 is a horizontal section of the stamp feeding mechanism on approximately the line 19—19 of Fig. 20 enlarged. Fig. 20 is a vertical section on the line 20—20 of Fig. 19 enlarged. Fig. 21 is a perspective view enlarged of the wiper carrying slide. Fig. 22 is a perspective view enlarged of the wiper. Fig. 23 is a perspective view enlarged of the end of the wiper carrying spring. Fig. 24 is a plan view of the base of the machine, with portions of the case in section. Fig. 25 is a cross section through the wiper and water feeding box and wick, on the line 25 of Fig. 10. Fig. 26 is a cross section on the line 26 of Fig. 10 showing the wiper disconnecting wedge. Fig. 27 is a view similar to 26 with the wedge in its operated position which allows the wiper to become disconnected. Fig. 28 is a perspective view of the coin retaining shelf. Fig. 29 is a perspective view of the pivoted chute. Fig. 30 is a horizontal section showing the locking bar on line 30—30 of Figs. 3 and 31. Fig. 31 is a side elevation of a part of the case near the locking bar, with portions in section. Fig. 32 is a view of the relation of the two slides and the cam lever.

Similar reference numerals are used to designate similar parts in the several figures of the drawings.

Reference numeral 15 designates a case provided with downwardly projecting hooks 16 which pass through slots 17 in a base 40. After the hooks have passed through said slots 17 the case is given a backward movement and thereby secured to said base (Fig. 3). The bolt 18 of a lock, the mechanism of which is inclosed in the casing 19 and is operated by a key inserted in the slot 20, is adapted to hold the said case in the above described position, when moved into the aperture 21 of the base, as shown in Fig. 31.

*Coin controlled mechanism.*—A lever 26 pivoted at 28 to the interior framework 60 is provided at its lower end with a foot 25 which enters the aperture 21 in the base. The upper end of the lever 26 is provided with a lug 27 which is adapted to engage with a lug 30 on a disk 32 which is keyed to a main shaft 31 of the machine. A spring 29 tends to cause the lever 26 to take the above described position. The foot 25 is adapted to receive the downward pressure of the lock bar 18. This downward pressure causes the lever 26 to be moved to a position such that the lug 27 will move out of engagement with the lug 30. The disk 32 is fixed to the main shaft 31 by a pin 34. The hub 33 of the said disk 32 is provided with a notch 35 which is adapted to receive the hooked end of the lever 71 of Figs. 3 and 12.

The case 15 is provided with the glass window 45 which is fixed in place behind the aperture 46. The case is also provided with the slot 47 for the insertion of a coin which controls the mechanism of the machine. The letter to be stamped is placed below the downwardly projecting portion 48 and may be guided into position by the inclined surfaces 49 and 50 at either side of the said projection 48. The space 51 between said downwardly projecting portion 48 and the case 40 of the machine is made sufficient to permit the easy insertion of the letter.

The greater part of the mechanism of the machine is supported by the framework, of which the plates 60 and 61 comprise the main elements. The plate 60 may be called the right-hand frame and the plate 61 the left-hand frame. These plates 60 and 61 are secured to the base 40 and are provided with upwardly projecting posts 62 having the slots 63 into which the shaft of a drum carrying a strip of stamps is inserted. A plate 64 is fixed to the front edges of the side frames 60 and 61. A plate 65 is fixed to the rear edges of the side frames 60, 61. It will be seen that the four plates 60, 61, 64 and 65 form the framework of the machine. A hollow shaft 70 is journaled in the side frames 60 and 61. The side frame 61 is provided with an inwardly bent portion 66 which supports the left-hand journal 77 of said hollow shaft 70. Shoulders 78 and 79 cause the shaft to be held in position against endwise movement. The hook shaped lever 71 is pivoted at 72, upon the right-hand face or end 74 of the said hollow shaft 70. A spring 73 fixed also to the end face of said shaft bears upon the opposite arm 75 of said lever 71. The tension of the spring 73 tends at all times to cause the engagement of the hook end of the lever with the notch 35 in the hub of the disk 32. A lever 80 pivoted at 81 to the side frame 60 is provided with a lateral projection 82 at its upper end. This projection 82 has an inclined face 85 and in its normal position closes the slot 47 in the casing 15. A spring 84 fixed to the main frame constantly tends to maintain the said lever in the said normal position. The lever 80 is provided with another lateral projection 83 which passes through a slot 84ª in the side frame 60. In the normal position of said lever this projection 83 has a position directly above a notch 86 in the lever 71, Fig. 14. This notch 86 is formed by a bend 87 in the arm 75 of the said lever. This notch is so placed that the bodily movement of the lever 71 about the axis of the shaft 31 when it is carried around by the hollow shaft 70, will cause it to pass the projection 83. It will be seen that if the projection 83 were moved away from its normal position in which normal position it is shown in Figs. 3 and 12, the said movement about the shaft 31 would be prevented. It will also be seen that when the said shaft is rotated the hooked end of the lever 71 would be moved out of engagement with the notch 35, if the projection 83 were not in its normal position. The lever 71 being pivoted to the hollow shaft 70 and the disk 32 being fixed to the shaft 31 it will seem that interference by the projection 83 with the arm 75 will cause a disengagement or unclutching of the shaft 31 and hollow shaft 70.

A lever 90 is pivoted to the main frame at 93 and is provided with a projection 91 at its upper end. This projection 91 has a sloping or beveled portion 95 which lies beneath the slot 47 and in the path of a coin which may be inserted therein. A spring 92 fixed to the main frame is so mounted that it constantly tends to cause the projection 91 to move to the left in Fig. 11 and in the path of a coin, which may be inserted in the slot. The lower end of the lever 90 is provided with a lug or projecting portion 94 which in the unoperated position of the lever lies directly above the extreme end of the arm 75 of the lever 71. The lever 90 is so mounted and proportioned that when a coin is pressed into the slot against the sloping face 95 and projection 91, the lug 94 will be moved away from its position above the end of said arm 75. The said arm 75 and lever 71 will then be free to move in a circular direction about the axis of the shaft 31. The hooked end of the lever 71 will become engaged with the notch 35, because of the tension of the spring 73. This engagement can take place only when the projection 83 on the lever 80 is in its normal position above the notch 86 in the lever 71. The above description of the parts applies particularly to their positions as shown in Fig. 12. At any other position in the rotary movement of shafts 31 and 70 the hooked end of the lever 71 will of course be free to engage the notch 35 under the tension of the spring 73. A gear 100 is fixed to the hollow shaft 70 and lies between the shoulder 79 of said shaft and the side frame 60. This gear 100 meshes with a gear 101 having twice the number of teeth and supported on a stud 102 in the main frame 60. The gear 101 is provided with a ring shaped projection 103, which is interrupted or cut away for a portion of the circumference at 104 (Fig. 12). The lever 80 has a lateral projection 110, which is adapted to move into the space 104 when the said lever 80 is operated. When the lever 80 is in its unoperated position, as shown in Fig. 12, the projection 110 is within the ring 103 and the gear 101 is free to rotate. In the operated position of the lever 80, however, the projection 110 is brought into the space 104 and interference with the ring 103 results and prevents the rotation of said gear 101. It will be seen that two rotations of the gear 100 will be necessary to cause one rotation of the gear 101. This is due to the fact that there are twice as many teeth in gear 101 as there are in gear 100. After the gear 101 has been rotated to a sufficient extent to move the notch in the ring 103 out of the range of the projection 101, the lever 80 cannot be again operated until two complete revolutions of the gear 100 have taken place.

The gear 101 is provided with an aperture 115, which is adapted to receive the lug 95 of the lever 90. The gear 101 is also provided with an inclined lug 116, which lies at such a radius as to engage the projection 95. After one-half of a revolution of the gear 101 which corresponds with one revolution of the gear 100, the inclined lug 116 will come into engagement with the projection 95 and produce a movement of the lever 90. Another half revolution of the gear 101 corresponding with the whole revolution of the gear 100 will again bring the aperture 115 opposite to the projection 95. It will be seen that in one complete revolution of the gear 101 the lever 90 will be given two movements. One of these movements will be to cause the lever 90 to come to its normal position as shown in Fig. 11. This position causes the projection 91 to lie in the path of the coin that may be inserted The other movement will be such as to move the projection 91 out of the path of the coin. This latter movement, as will be described later, causes a release of a coin that is being held by the projection 91.

The coin slot 47 leads to a chute 120 having vertical and inclined portions formed by bars 121, 122. The chute lies between the frame plate 64 and a thinner sheet metal piece 135, and leads to a hinged chute 124. The chute 124 inclines downwardly to the left as seen in Fig. 2 and is hinged to the small rod 136 carried by the lugs 137, and engaging the hinge members 126. A slot 123 in the chute 124 receives the coin from the chute 120, a flange 134 serving to guide the coin to said slot (Fig. 29). At the lower end of the chute 124 is a slot 125 for the discharge of the coin. This slot 125 normally lies above a shelf 127 which is attached to the main frame, and it is only when the chute 124 is swung outwardly and free of the shelf 127 that the coin is free to drop through the slot 125.

The chute 124 is of sufficient length to hold three coins at the same time, and they are visible from the outside of the machine through the glass window 45. The chute is swung outwardly to discharge the lowermost coin, by an arm 130 on the lever 80. This arm lies directly behind and in alinement with a notch 129 in the hinged chute 124. The said arm is adapted to push the chute outwardly only when a coin lies therein and prevents the passage of the arm through said notch 129. An upwardly projecting lug 131 (Fig. 2) on the shelf 127 is adapted to lie across the lower part of the chute 124 when the chute is swung to its outer position. In this position the lug 131 occupies a notch 132 and prevents the middle coin from rolling to the lower end of the chute. A spring 133 causes the chute 124 to return to its normal position when the arm 130 is drawn back. The lug 131 is then out of the notch 132 and the middle coin is free to roll to the lower end of the chute. An end wall 128 closes the end of the chute and is preferably made integral with the shelf 127. After leaving the chute 124 the coin drops upon an inclined chute 139 which leads to a box 140 where the coins are collected.

*Affixing mechanism.*—The hollow shaft 70 has a crank disk 150 fixed to its end, and said disk carries a crank pin 151. This crank pin 151 actuates the principal moving parts of the machine by means of slides 152 and 170 and the cam lever 180. The cam lever 180 is connected with mechanism which draws the stamps from a reel as will be described later and feeds them forward to cutting and affixing devices.

The slide 152 (Fig. 9) is provided with a slot 160 composed of a horizontal portion 159, an inclined portion 160$^a$ and another horizontal portion 161. The crank pin 151 operates in this slot causing a vertically reciprocating movement, the slide being guided in a vertical direction by the pins 155 and 156 which work in the slots 157. The slide 152 is provided with a right-angular foot 153 at its lower end which carries four downwardly projecting needles 154. These needles are adapted to penetrate the stamp while it is being held in their downward path, and then to carry the stamp downwardly to the point where it is to be affixed. The movement of the pin 151 to the right as viewed in Figs. 9, 10 and 32 first causes a rapid downward movement of the slide 152 as said pin moves along the upwardly inclined portion 160$^a$ of the slot. The subsequent downward movement which takes place after the pin 151 has reached the horizontal portion 161 is of a kind commonly known as simple harmonic.

The slide 170 is provided with a slot 171 at right angles to its direction of movement in which the crank pin 151 also operates. The pin 151 causes a vertically reciprocating movement of said slide, this slide 170 being also guided by the pins 155 and 156 which work in the slots 172 and 173. The movement of the slide is therefore simple harmonic. The slide 170 has a right angularly projecting foot 174 at its lower end to which is fixed the pressure pad 175, which is preferably made of rubber. The foot 174 is provided with apertures 176 in alinement with the needles 154 on the slide 152. The slide 152 is adapted to move quickly downward during the early part of its stroke, because of the inclined portion 160$^a$ of its slot, while the slide 170 has a more uniform movement. These relative movements result in the foot 153 quickly approaching or overtaking the foot 174 and cause the needles 154 to penetrate the pad 175 and protrude below its lower face. At this point they lie above the stamp 162 which has previously been fed forward to a position directly below the pad 175 by mechanism which will be described later. This mechanism includes arms 200 which hold the stamp in position while it is being perforated by the needles. The inclined portion 160$^a$ of the slot 160 is also adapted to cause the slide 152 to be raised before the crank pin 151 has reached the lower extremity of its circular movement. This movement results in the withdrawal of the needles 154 from their extended position below the pad 175 before the said pad reaches its lowermost position. The pad is then free to press the stamp into position.

*Feeding mechanism.*—The cam lever 182 is pivoted at 181 to the side frame 61. The lower end of the lever 182 is pivotally connected to a stamp feeding slide or cradle 183, by a pin 202. This cam lever 182 is provided with a loop shaped cam portion 180 within the interior of which loop, the crank pin 151 operates. The outline of the interior of said loop has a particular shape given to it in order to bring about the desired reciprocating movements in the stamp feeding cradle or slide 183. These reciprocating movements should be such as to bring the stamp beneath the pressure pad 175, needles 174 etc. at the right time. These movements should also be such as to withdraw the arms 200 out of the path of said descending parts, after the said arms have performed their work. The moistening apparatus, one of the principal parts of which is represented by 260 and is termed the "moistening member", should be given the proper stroke across the gummed face of the stamp by the said cam 180, which will hereafter be described.

A straight portion 184 of the interior edge of the cam is provided to give an initial movement to the slide 183. The straight portion 185 makes an angle with the part 183, and said angular portion causes the pin 151 to accelerate the said movement of the slide 183. The curved portion 186 is adapted to cause a rest in the movement at the end of the stroke because of the fact that at that time it will lie along a radial line running from the center of the shaft 31 to the pivot 181.

The inclined edge 187 is acted upon by the pin 151 to cause the initial part of the return movement of said slide 183. The shoulder 188 is adapted to receive the pressure of the pin 151 rather quickly and to cause a rapid movement in the latter part of the return stroke. The circular portion 189 is designed to be concentric with the movement of the pin 151 during the remainder of its revolution. During this period no movement is produced.

The feed arms 200 are shown more in detail in Figs. 19 and 20. They are pivoted to the stamp feeding slide or cradle 183 by means of the pin 201. This pin 201 is carried in holes 201$^a$ in cradle 183 Fig. 17.

The cradle 183 is guided at its forward end by the pins 202 and 204 which work in the slots 205 in the said frames 60 and 61. The pin 202 transmits the movement from the lower end of the cam lever 182 to the said slide 183. The opposite end of the stamp feeding slide or cradle 183 is guided by the lugs 206, which project laterally from the side walls 208 of the said slide and work in the slots 207 in the side frames 60 and 61. The side walls 208 are rigidly connected by the main body 209 or bottom plate of the said slide or cradle 183.

The feeding arms 200 are provided with pointed lugs 215 which are adapted to enter the perforations between the stamps. The stamps are arranged in ribbon form and wound upon a reel. This ribbon of stamps 216 is unwound from the reel 217 while the stamps are being consumed. Said reel is supported by means of a shaft or trunnions 218 in upwardly projecting posts 62 of the side frames 60 and 61. The arms 200 are provided with laterally projecting lugs 219 which are adapted to ride upon the inclined faces 220 and on to the horizontally disposed faces of parts which are to be described later. The forward portions of the arms 200 are provided with V-shaped grooves 222, which are adapted to receive the ends of the needles 154 while they are being pressed through the stamp, during the downward movement of the slide 152. A pressure plate 225 is adapted to rest upon the upper surface of the stamp while it is being engaged by the pointed lugs 215. The said pressure plate is provided with rearwardly extending arms 226 which are pivotally attached to the frame by the pins 227. A spring 228 is provided with an angularly disposed end 230 which is inserted beneath the downwardly projecting lug 229 in the main frame. The other end 231 of the said spring 228 rests upon the upper side of the main body of the pressure plate 225 and causes a pressure on said plate downwardly against the stamp. The under side of the pressure plate is provided with grooves 232 which permit the pointed lugs 215 to pass through perforations in the stamp without interference with said pressure plate.

A supporting device and guide for the feed arms 200 is represented by the numeral 240 and termed a basket (Fig. 18). The said basket is provided with rearwardly extending arms 241, which are pivotally attached to the main frame by means of the pin 227. The said basket is also provided with rearwardly extending arms which terminate in the sloping ends 242, which lead upwardly to a horizontal portion 243, which in turn leads to another inclined portion 220 and which also leads upwardly to a horizontally disposed portion 221. The lugs 219 of the feed arms 200 are adapted to slide upon the said surfaces 242, 243, 220 and 221 and the desired movements are thereby given to the said arms to cause the pointed lugs 215 to properly enter the perforations in the stamps.

The basket 240 is provided with lateral openings 244, in which are disposed springs 246 fixed to the basket at the lower edges of said openings. These springs 246 project upwardly and are curved inwardly, and at their extreme upper ends are provided with outwardly bent ends 245, which terminate at a level slightly below the horizontal guiding surfaces 221. The curved surfaces of said springs 246 which are adjacent the upper ends 245 are spaced from each other a distance slightly less than the distance between the outer extremities of the lugs 219. It will be seen that a downward movement of the lugs 219 after they pass the supporting surfaces 221 will be yieldably resisted by the tension of these springs. The basket is also provided with the rearwardly and upwardly extending leaf-springs 247 which terminate in horizontally disposed portions 248. These springs are adapted to lift the feeding arms 200 during their rearward movement, and the portions 248 are adapted to hold them in a position ready for a new feeding stroke. The basket 240 is also provided with knives 249, which are adapted to cut the stamp from the ribbon at the time the pressure pad 175 comes to a position adjacent the edges of said knife. The basket 240 is also provided with upwardly projecting and pointed lugs 250 at the extremity of the horizontal guiding surfaces 221. These lugs 250 are adapted to coact with the pressure plate 225 in clamping or gripping the forward outer edges of the stamp, and holding it rigidly in place while the cutting off of the preceding stamp is taking place, while the feeding arms are being withdrawn to their initial position, and during all such other portions of the operations in which the stamp is not in motion.

The inclined guide surfaces 220 are adapted to press the pointed lugs 215 through the perforations of the stamp, and to raise the stamp and pressure plate out of contact with the lugs 250. The horizontally disposed guide surface 221 maintains an upward pressure of the arms against the stamp and pressure plate, and also holds the pointed lugs in engagement with the perforations during the forward feeding stroke of the stamp. The basket 240 is supported in the main frame at its forward end by the laterally projecting lugs 251, which are preferably extensions of the cutting knives 249. These lugs 251 lie below the lugs 252 in the main frame 60 and 61. They are pressed downwardly into the slot 253 and then forwardly to a position beneath the said lugs 252. As before described the other end of the basket is supported by the pin 227. The cutting knives 249 are slotted at 254 to permit the downward movement of the arms 200 after they have performed their mission of feeding the stamp to its position under the pad 175. The pointed lugs 215 are so disposed upon the arms 200 that at the extremity of the forward movement of the stamp feeding mechanism they will be in alinement with the knives 249.

The moistener 260 is provided with lugs 261 which are inserted in apertures 262 in the upwardly projecting lugs 263 of the moistener carrying spring 266 (Figs. 10, 22 and 23). The upwardly projecting end 264 of said spring serves to prevent the forward tilting of the moistener 260. A spring 268 bears upon the rearwardly extending loop of said moistener 260 and prevents its tilting backwardly, while allowing a certain freedom of movement thereof. The springs 266 and 268 are fixed at 267 to the moistener slide 270. The spring 266 is provided with laterally projecting lugs 265, which bear upon the inclined under edges 277 of the side frames 60 and 61. These inclined edges 277 are joined to a curved portion 279 at their lower ends, said curved portion terminating at the slightly elevated ends 278.

The above described inclined edges and curves serve as a guiding means for the moistener 260. The moistening pad 280 is disposed just above the extremities 278 of said guides and it will be seen that as the moistener travels rearwardly it will have combined upward and rearward movements which bring it into contact with said moistening pad 280. The moistening pad 280 is inclosed in an inverted holder 281, which extends through an aperture 285 in the side frame 61 and opens into the water receptacle 282. The water in this receptacle as shown by the numeral 283 lies below the level of the under surface of the pad 280. This pad 280 is in the nature of a wick and as will be seen in Fig. 25 is led downwardly to the bottom of said water receptacle 282. A cap 284 is provided for filling the receptacle with water.

The moistener slide 270 is provided with laterally projecting lugs 271 at its forward end which slide in guide slots 271$^a$ in the said frame 60 and 61. The lateral projections 272 at the rear end of the moistener slide lie at the upper end of the inclined portion 273 of said slide, and are guided by the slots 207 in the side frames 60, 61. The lateral projections 272 have a limited movement relative to the stamp feeding slide or cradle 183. This movement is limited by the shoulder 274 in one direction and by the lugs 206 in the other direction.

The wiper slide 270 is provided with a rearwardly projecting extension 275, which is adapted to pass through an aperture 302 in the main frame and to come in contact with an inclined plate 290 upon the upper end of the upwardly projecting end 291 of a lever 292. The lever 292 is pivoted at 293 to the base plate 40 and is adapted to be operated by the hand of the operator at the end 294 (Figs. 24 and 27). The plate 290 is provided with a downwardly inclined portion 299 and the lever 292 is so mounted that a movement of the forward end 294 of the lever will cause the upper portion 290$^a$ of said plate to be removed from a position beneath the end of the extension 275. The extension 275 is, therefore, free to fall and the lugs 272 will drop into the lower part 300 of the enlarged end of the slots 207. The shoulder 301 is adapted to come in contact with the lugs 206 and prevent the forward motion of the moistener. A spring 303 fixed at 304 to the base plate and the other end 305 to the lever 292 serves to bring said lever to its normal position when the hand of the operator is removed from the end 294. The inclined portion 299 of the plate 290 raises the extension 275 and with it the rear end of the moistener slide 270. The moistener is by this means again operatively connected with the stamp feeding slide or cradle 183. A slide 296 is loosely attached to the lever 292 by the pin or lug 295. The slide 296 is fitted within a groove 297 in the base 40 and normally fills said groove from end to end. A continuous flat surface is then presented for the article to lie on and to receive the pressure of the affixing pad 175. When the end 294 of lever 292 is moved to the left, the slide 296 is removed from the path of the stamp and a dry stamp will fall into said groove.

A counting device 320, Fig. 3, is fixed to the casing by rivets or screws 321 upon the interior of said casing. An aperture 322 is provided in the casing in such a position as to permit the reading of the characters on the indicating disks. The indicating disks or wheels in this counter are preferably made to count down or backwardly from the largest number which the counter indicates. This number will, therefore, at any time indicate the number of stamps that remain in the machine. The counting mechanism includes a star wheel 323 whose teeth are engaged by the hooked end 325 of a spring 324, attached at 326 to the slide 152. It will be seen that every downward stroke of the slide 152 will cause a rotary movement of the star wheel 323. The construction of the mechanism of this counter is of a well known form and is not illustrated in the drawings or described in the specification.

*Operation.*—The operation of the machine will now be described in a general way, much of the detail of the mechanism and its functions and operations having already been referred to. It will be understood that the lever 26 has been operated by the lock bar 18 in such a manner as to cause the lug 27 to be moved out of the path of the lug 30. The shaft 31 on the machine is then free to be operated in a right hand direction as viewed in Fig. 3. When the lever 26 has not been thus operated the handle 22 can be unscrewed from the shaft 31, the disk 32 making a revolution until the lug 30 comes in contact with the opposite side of the lug 27.

Referring to Fig. 1, the person using the machine first inserts a coin in the slot 47. The said coin engages the inclined surface 82 and pushes the end 85 of the lever 80 backwardly, thus bringing the projection 83 to a position out of registry with the notch 86 and in the path of the lever 71. The shaft 31 cannot then be rotated without causing the lever 71 to be disengaged at its hooked end from the notch 35. This amounts to an operative disengagement of the shaft 31 from the hollow shaft 70. Because of the fact that all of the important mechanism of the machine is driven by the hollow shaft 70, it will be seen that a stamp cannot be delivered until the coin is pushed far enough to pass entirely within the end 85 of the lever 80. This will permit the projection 83 to lie directly above the notch 86. In this relation of the parts the hooked end of the lever 71 will not be moved out of the notch 35 when the shaft 31 is rotated, unless the projecting lug 94 of the lever 90 interferes with said lever 71. When the coin is fully inserted within the slot 47 beyond the end 82 of the lever 80 it comes into contact with the beveled end 95 of the lever 90. Through this means the lever 90 is oscillated until the coin rests against the end of the lug 91. By this movement the projecting lug 94 of the lever 90 will be removed from a position above the end of the arm 75 of the lever 71. This lug 94 will then not interfere with the movement of the lever 71. When the lug 94 is removed from such position and the projection 83 lies directly above the notch 86 the lever 71 is then entirely free to make an operative engagement of the shaft 31 with the hollow shaft 70. This condition of the parts occurs when the coin has been fully inserted in the slot below the end 82 of lever 80 and lies in contact with the edge of the lug 91. The machine can then be operated in the desired manner to deliver and affix a stamp.

Because of the tension of the spring 92 the edge of the lug 91 of the lever 90 will be held against the edge of the coin and the coin will be retained in this position until released by mechanism described below. As before stated this machine is designed to deliver two stamps after a single coin is inserted. The operation of the mechanism whereby two stamps are delivered by the same coin is as follows: When the gear 101 has made half a revolution the inclined lug 116 comes into contact with the lug 95, and causes the movement of said lever against the spring 92 and releases the coin from engagement with the lug 91. The lug 94 then snaps back into contact with the surfaces of the gear 101 and is thereby prevented from coming back into a position above the arm 75 of the lever 71. Another revolution therefore of the shafts 31 and 70 can be made and another stamp delivered. At the end of this second revolution, however, the lug 95 of the lever 90 drops into the aperture 115. This brings the lug 94 into a position above the end of the arm 75 and prevents another revolution of the said shafts 70 because of the disengagement of the hooked end of the lever 71 with the notch 35. The handle can then be rotated idly only, without causing an operation of the mechanism. The lever 80 with its slot closing end 85 cannot be tampered with after the machine has once been started until the complete revolution of the gear 101 has taken place. Two stamps are delivered during the complete revolution of said gear 101. The means by which a movement of the lever 80 is prevented consists of the projection 110 on said lever and the ring shaped part 103 on the gear 101. After a revolution of the said gear 101 has been started the projection 110 lies inside of this ring and out of a position opposite to the notch 104 in said ring. It will be seen that the lever 80 cannot be moved in such a manner as to cause the end 85 to open the slot 47 until a complete revolution of the gear has taken place. This complete revolution will again bring the notch 104 to a position adjacent the lug 110. The lug 110 can then move into the notch 104 and the end 85 can thereby be pushed back to uncover the slot.

After the coin has been released by the lug 91 of the lever 90 it drops down the chute 120 and through the slot 123 into the inclined chute 124. It will drop into the chute 124 provided the upper one of the three coins has moved to the left and out of the way. This will have taken place because of the fact that the lowermost coin in said chute has been released and the second coin will have moved down to the lower end of the chute. The lowermost point in the chute is opened by the outwardly swinging movement of the chute 124. This is brought about by the movement of the lever 80 through the arm 130. This arm 130 is pushed forward into the notch 129 and against the uppermost coin of the chute provided a coin occupies the upper end of the chute. By means of the uppermost coin and the arm 130 the chute is swung outwardly and the slot 125 in the lower edge of the chute is moved away from the shelf 127. The lowermost coin is then free to drop and slide down the inclined guideway 139 to the box 140. In the meantime the notch 132 has been moved out to a position such that the projection 131 fills said notch thereby lying across the bottom of the chute and preventing the downward movement of the second coin. When the chute has dropped back to its normal position the lug 131 no longer occupies the notch 132 and the coin is free to go down to the lower end of the chute. The slot 125 of course then lies above the shelf 127 and the coin cannot drop out. In case no coin lies in the upper end of the chute 124 the arm 130 can pass through the notch 129 without causing an outward swinging movement of the chute 124. In that case of course the lowermost corner will not be released. As a matter of fact no coin will be released from the chute 124 until the said chute is filled with coins.

The operation of the crank pin 151, the slides 152, 170, and the cam lever 182 has already been described. It will be noted in general that the foot 153 and the needles 154 affixed thereto will begin to move downwardly through the foot 174 carrying the pad 175. The needles 154 will therefore be caused to penetrate the pad and project below the lower surface thereof. In the meantime the stamp 162 has been fed forward. This is accomplished by the lever 182, slide 183 and the arms 200. The arms 200 have the upwardly projecting pointed lugs 215 which engage the perforations between the stamps and push the end stamp 162 forward. By the time the end of the stamp 162 has reached a position below the outer edge of the pad 175 the needles will be pushed down to a position ready to perforate said stamp. A further movement of the parts causes the needles to pass through the stamp and into the grooves 222 in the ends of the arms 200. The pad 175 and the needles 154 move downwardly together and push the arms 200 before them. A sufficient resistance, however, to the downward movement of the arms 200 to permit the perforation of the stamp by the needles 154, has been offered by the springs 246. The upper ends of these springs stand in the path of the ends of the lugs 219 when the arms 200 are pushed downward. The curved ends 245 of the springs 246 permit the lugs 219 to wedge them outwardly and to pass them. The arms 200 then drop downwardly to the bottom of the basket 240. During the above described operation the curved part 186 of the cam 180 has had a position adjacent to the crank pin 151. This curved part 186 is substantially concentric with the center of movement of the crank pin and thereby provides a rest for said cam. The further movement of the crank pin, however, quickly causes it to come in contact with the inclined edge 187 and the lever 182 is pushed back carrying with it the slide 183 and thereby the arms 200 are withdrawn from beneath the pad 175. The shoulder 188 hastens the movement and the arms 200 are finally moved back to a position such that their lugs 219 rest upon the horizontally disposed ends 248 of the spring 247. During their backward movement they have moved upon the inclined part of the spring 247. During the above described operation the needles 154 and pad 175 have been moving downwardly because of the action of the crank pin 151 upon the cam slots 161 and 171. At about the same moment the arms 200 begin their forward stamp feeding movement the moistener 260 is pushed forwardly out of contact with the moistening pad 280. This is brought about by means of the lugs 206 which come in contact with the lugs 272 of the moistener slide 270. The downwardly curved edge 279 and the upwardly inclined portion 277 of said edge act upon the lugs 265 in such a way as to move the moistener 260 downwardly and then forwardly and upwardly to a position beneath the outer and lower edge of the pad 175. In this position of course it will lie below the outer edge of the stamp as it is being carried down by the needles and the pad. At the proper moment the moistener 260 is moved backwardly, this movement being effected by the cam 180, cam lever 182 and slide lever 183 as previously described. The pad 175 presses the stamp against the moistener 260 and the parts are so proportioned that the springs 266 and 268 cause a pressure of the moistener upon the under side of the stamp during the backward movement of said moistener. The water that is carried by the moistener will be transferred to the gummed under portion of the stamp. The further downward movement of the pad 175 presses the stamp against the letter or other article to which it is desired to affix it. In the meantime the moistener has been completely drawn back into contact with the moistening pad 280 and out of the path of the stamp. The needles 154 are withdrawn from the stamp just before the pad reaches its lowermost position, by the crank pin 151 which at this time comes into engagement with the inclined portion 160$^a$ of the cam slot 160.

To deliver a dry stamp the end 294 of the lever 292 is pressed to the left by the operator and the rear end 290 is moved to a position which permits the rear end 275 of the slide 270 to drop down. The lug 272 then drops down to a position behind the shoulder 301 in the enlarged portion 300 of the slot 207. The moistener is thereby prevented from moving forward. The end of the slide 296 is by this movement brought to a position out of the path of the stamp and the said stamp drops into the groove 297. When the operator ceases pressing upon the end 294 the spring 303 causes the lever to return to its normal position, during which movement the slide 296 pushes the dry stamp out from beneath the machine where it can be picked up by the operator.

When inserting a new ribbon of stamps into the machine the end of the foremost stamp is placed adjacent the edge of the knife 249, and the lateral edges of the stamp in contact with the upwardly projecting lugs 250. Previously the pressure plate 225 is elevated to permit this. This is done by removing the end of the spring 230 from beneath the lug 229 on the main frame. The pressure plate 225 can be swung upwardly about its pivot 227 entirely out of the way for the insertion of the end of the ribbon of stamps. Each downward stroke of the slide 152 causes the hook 325 to effect a movement of the star wheel 323 and to cause the indicating mechanism to show one stamp less through the aperture 322 in the casing.

From the foregoing description, it will be observed that I have invented a machine for vending or delivering stamps, labels, tickets, or similar flexible devices, which will positively and exactly sever the article or articles to be delivered from a strip of such articles. It will further be observed that I have invented improved coin controlled mechanism for governing the operation of the vending machine, which reduces to a minimum the liability of the machine being fraudulently operated. It will further be evident that I have provided efficient mechanism for affixing the delivered or vended stamp or similar article to an object such as an envelop, which mechanism may at will be rendered inoperative when it is desired to deliver the stamp or similar article in a dry condition without affixing the same to an object.

While I have illustrated and described my improved vending mechanism as governed by a coin controlled mechanism, and as used in connection with affixing mechanism, yet it should be understood that my improved vending mechanism is capable of practical use for some purposes independently of any coin controlled or affixing mechanisms.

I do not in this application claim the coin controlled mechanism herein illustrated and described, as said coin controlled mechanism forms the subject-matter of my copending divisional application Serial No. 599,181, filed December 24, 1910.

While I have described more or less precisely the details of construction, I do not wish to be understood as limiting myself thereto, as I contemplate changes in form and the proportion of parts and the substitution of equivalents as circumstances may suggest or render expedient without departing from the spirit of my invention.

I claim:—

1. In a machine for delivering stamps and similar articles, the combination with feeding mechanism for engaging and feeding forward a strip of stamps, of a reciprocating member moving in a plane transverse to and into the path of the feeding mechanism, a cutting edge located adjacent the path of said member and over which the stamps are fed, means for moving said feeding mechanism toward and into the path of said member to project the stamp beneath said member, and for withdrawing the feeding mechanism away from the path of said member, and automatic means for moving said member to engage the said underlying stamp and force the same past said cutting edge while supported by the feeding mechanism.

2. In a machine for delivering stamps and similar articles, the combination with feeding mechanism for engaging and feeding forward a strip of stamps, of a reciprocating member moving in a plane transverse to and intersecting the path of the feeding mechanism, a cutting edge located adjacent the path of said member and over which the stamps are fed, means for moving said feeding mechanism toward the path of said member to project the stamp beneath said member, means for penetrating the stamp fed forward by the feeding mechanism and retaining the same in the path of said member, means for withdrawing the feeding mechanism away from the path of said member, and automatic means for moving said member to engage the said underlying stamp and force the same past said cutting edge.

3. In a machine for delivering stamps and similar articles, the combination with reciprocating feeding mechanism for engaging and feeding forward a strip of stamps, of a reciprocating member moving in a plane transverse to and intersecting the path of the feeding mechanism, a cutting edge located adjacent the path of said member with which said member directly coöperates to successively sever the stamps and over which the stamps are fed, means for moving said feeding mechanism toward the path of said member to project the stamp beneath said member, means for moving said member to engage the underlying stamp and force the same past said cutting edge, and positively actuated means for moistening the stamp while underlying and directly resting against said reciprocating member.

4. In a machine for vending stamps and similar articles, the combination with a pair of spaced arms for engaging and feeding forward a strip of stamps, of a cutting edge over which the stamps are fed by said arms, means moving in a plane intersecting the path of said arms and engaging the stamps after they are fed over said cutting edge and forcing them past the cutting edge, and means for retracting said arms out of the path of said last mentioned means.

5. In a machine for vending stamps and similar articles, the combination with a pair of spaced arms for engaging and feeding forward a strip of stamps, of a cutting edge over which the stamps are fed by said arms, means engaging the stamps after they are fed over said cutting edge and forcing them past the cutting edge, means for retracting said arms out of the path of said last mentioned means, and means for moistening the severed stamps.

6. In a machine for vending stamps and similar articles, the combination with feeding mechanism comprising points adapted to engage the perforations between adjacent stamps in a strip of stamps, of a reciprocating member adapted to successively engage the stamps after they are fed forward by the feeding mechanism and intersecting the path of said feeding mechanism, means coöperating with said reciprocating member for successively severing the stamps after they are presented by said feeding mechanism beneath said reciprocating member, and means for first actuating said feeding mechanism and subsequently automatically actuating said reciprocating member during each operation of the machine.

7. In a machine for vending stamps and similar articles, the combination with feeding mechanism comprising points adapted to engage the perforations between adjacent stamps in a strip of stamps, of a reciprocating member adapted to successively engage the stamps after they are fed forward by the feeding mechanism, means for successively severing the stamps after they are presented by said feeding mechanism beneath said reciprocating member, and means for moistening the stamps after they are severed and while engaged by said reciprocating member.

8. In a machine for delivering stamps and similar articles, the combination with mechanism for engaging and feeding forward a stamp, of reciprocating mechanism for holding the projected stamp while it is being held by said feeding mechanism, means for withdrawing the feeding mechanism, and means for removing the projected stamp from said holding mechanism.

9. In a machine for delivering stamps and similar articles, the combination with mechanism for engaging and feeding forward a stamp, of mechanism for engaging the projected stamp while being held by said feeding mechanism, means for withdrawing the feeding mechanism, means for removing the stamp from said engaging mechanism, and means for moistening the stamp prior to its removal from said engaging mechanism.

10. In a machine for delivering stamps and similar articles, the combination with a driving shaft, of reciprocating mechanism for feeding forward a stamp, mechanism for engaging a projected stamp while being held by said feeding mechanism, mechanism for moistening the stamp, mechanism for pressing the moistened stamp against a surface, and connections operated by said shaft for successively automatically actuating said several mechanisms in the stated sequence during each operation.

11. In a machine for vending stamps and similar articles, the combination with reciprocating feeding arms adapted to engage and feed forward a strip of stamps, of a pressure member for retaining the stamps against said feeding arms, pointed projections on said arms adapted to engage the perforations between adjacent stamps, means for moving said arms forward, a cutting edge over which the stamps are successively fed by said arms, means for withdrawing said arms away from the stamp in a plane below that of the stamp, and means reciprocating in a path intersecting the path of said feeding arms for engaging the stamps while supported by said arms and forcing the same past said cutting edge.

12. In a machine for vending stamps and similar articles, the combination with reciprocating feeding arms adapted to engage and feed forward a strip of stamps, of a pressure member for retaining the stamps against said feeding arms, pointed projections on said arms adapted to engage the perforations between adjacent stamps, means for moving said arms forward, a cutting edge over which the stamps are successively fed by said arms, reciprocating needles for engaging the stamps after they are fed forward and while supported by said arms, and means for forcing the stamps while held by said needles past said cutting edge.

13. In a machine for vending stamps and similar articles, the combination with reciprocating feeding arms adapted to engage and feed forward a strip of stamps, of a pressure member for retaining the stamps against said feeding arms, pointed projections on said arms adapted to engage the perforations between adjacent stamps, means for moving said arms forward, a cutting edge over which the stamps are successively fed by said arms, reciprocating needles for engaging the stamps after they are fed forward by said arms, means for forcing the stamps while held by said needles past said cutting edge, and means for disengaging the needles from the stamps after they have been severed.

14. In a machine for vending and affixing stamps and similar articles, the combination with mechanism for delivering a stamp from a supply thereof, of mechanism for moistening the delivered stamp, actuating mechanism for affixing the moist stamp to an object, means operatively connected to said mechanisms, and means for disconnecting the actuating means from the affixing mechanism when it is desired to deliver a stamp in a dry condition.

15. In a machine for delivering stamps and similar articles, the combination with reciprocating feeding mechanism underlying and adapted to feed forward the end stamp of a strip of stamps, of a reciprocating member moving in a plane transverse to and intersecting the path of the feeding mechanism, means for engaging the end stamp while the feeding mechanism underlies the same and holding it in the path of the reciprocating member, and operating mechanism for actuating said reciprocating member to engage and move the end stamp relatively to and disconnect it from the strip of stamps.

16. In a machine for delivering stamps and similar articles, the combination with reciprocating feeding mechanism underlying and adapted to feed forward the end stamp of a strip of stamps, of a reciprocating member moving in a plane transverse to and intersecting the path of the feeding mechanism, means for engaging the end stamp while the feeding mechanism underlies the same and holding it in the path of the reciprocating member, and means for retracting the feeding mechanism out of the path of the reciprocating member and in a plane lower than its forward path of movement.

17. In a machine for delivering stamps and similar articles, the combination with reciprocating feeding mechanism underlying and adapted to feed forward the end stamp of a strip of stamps, of a reciprocating member moving in a plane transverse to and intersecting the path of the feeding mechanism, needles carried by and reciprocable relatively to said member for engaging the end stamp while the feeding mechanism underlies the same and holding it in the path of said member, and operating mechanism for reciprocating said member to engage and move the stamp relatively to and disconnect it from the strip of stamps.

18. In a machine for delivering stamps and similar articles, the combination with reciprocating feeding mechanism underlying and adapted to feed forward the end stamp of a strip of stamps, of a reciprocating member moving in a plane transverse to and intersecting the path of the feeding mechanism, needles carried by and reciprocable relatively to said member for engaging the end stamp while the feeding mechanism underlies the same and holding it in the path of said member, operating mechanism for reciprocating said member to engage and move the stamp relatively to and disconnect it from the strip of stamps, and means for operating said needles to project them below the lower surface of said member prior to the movement of said member into contact with the stamp and to withdraw said needles above the lower surface of said member after the disengagement of the stamp from the strip of stamps.

19. In a machine for delivering stamps and similar articles, the combination with a rotary power shaft, of reciprocating feeding mechanism underlying and adapted to feed forward the end stamp of a strip of stamps, of a reciprocating member moving in a plane transverse to the path of the feeding mechanism, means for engaging the end stamp while the feeding mechanism underlies the same for holding it in the path of the reciprocating member, and means connecting said rotary shaft with said feeding mechanism, reciprocating member, and stamp engaging means for automatically actuating the same during each operation in sequence to feed a stamp forward and then disconnect said stamp from the strip of stamps.

20. In a machine for delivering stamps and similar articles, the combination with reciprocating feeding mechanism underlying and adapted to feed forward a strip of stamps, of a cutting edge over which the end stamp is projected by said feeding mechanism, a reciprocating member moving in a plane transverse to and intersecting the path of the feeding mechanism for engaging and moving the end stamp while supported by said feeding mechanism past said cutting edge, and operating mechanism for withdrawing the feeding mechanism after the end stamp has been severed from the strip of stamps.

21. In a machine for delivering stamps and similar articles, the combination with reciprocating feeding mechanism underlying and adapted to feed forward a strip of stamps, of a cutting edge over which the end stamp is projected by said feeding mechanism, a reciprocating member moving in a plane transverse to and intersecting the path of the feeding mechanism for engaging and moving the end stamp while supported by said feeding mechanism past said cutting edge, operating mechanism for withdrawing the feeding mechanism after the end stamp has been severed from the strip of stamps, and mechanism for moistening the severed stamp while engaged by said reciprocating member and subsequent to the withdrawal of said feeding mechanism.

22. In a machine for delivering stamps and similar articles, the combination with reciprocating mechanism for feeding forward a stamp, of mechanism for holding the stamp while supported by said feeding mechanism, means for withdrawing the feeding mechanism, means for moistening the stamp while supported by said holding mechanism, and means for removing the stamp from said holding mechanism.

23. In a machine for delivering stamps and similar articles, the combination with reciprocating mechanism for feeding forward a stamp, of moistening mechanism, a reciprocating cradle to which said feeding mechanism is pivotally connected, means connecting said moistening mechanism with said cradle to permit a predetermined lost motion, and means for reciprocating said cradle, whereby the feeding mechanism engages and feeds forward a stamp and is then withdrawn and the moistening mechanism through the lost motion connection with the cradle is subsequently drawn across the stamp.

24. In a machine for delivering stamps and similar articles, the combination with a reciprocating member adapted to engage a stamp and disconnect it from a strip of stamps, of reciprocating feeding mechanism, a reciprocating cradle to which said feeding mechanism is pivotally connected, and guides relatively to which said feeding mechanism is moved by said cradle, whereby the feeding mechanism projects a stamp into the path of said member and holds the stamp while it is moved by said member and disconnected from the strip of stamps, the feeding mechanism being then withdrawn out of the path of said member.

25. In a machine for delivering stamps and similar articles, the combination with a reciprocating member adapted to engage a stamp and disconnect it from a strip of stamps, of reciprocating feeding mechanism for projecting a stamp into the path of said member comprising points adapted to engage in perforations between adjacent stamps and ears adjacent said points adapted to bear against the strip of stamps, a plate overlying the strip of stamps against which said ears press the strip of stamps, and means for reciprocating said feeding mechanism to move the same relatively to said plate and thereby feed forward the strip of stamps.

In testimony whereof, I have subscribed my name.

GEORGE L. REICHHELM.

Witnesses:
GEO. L. WILKINSON,
GEORGE M. JARECKI.